US010373295B2

(12) United States Patent
Sato

(10) Patent No.: US 10,373,295 B2
(45) Date of Patent: *Aug. 6, 2019

(54) IMAGE PROCESSING APPARATUS AND IMAGE PROCESSING METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 15/437,717

(22) Filed: Feb. 21, 2017

(65) Prior Publication Data

US 2017/0163981 A1    Jun. 8, 2017

Related U.S. Application Data

(63) Continuation of application No. 14/710,769, filed on May 13, 2015, now Pat. No. 9,613,400, which is a (Continued)

(30) Foreign Application Priority Data

Apr. 9, 2010    (JP) .................................. 2010-090333

(51) Int. Cl.
*G06K 9/36*    (2006.01)
*G06T 5/00*    (2006.01)
(Continued)

(52) U.S. Cl.
CPC ............. *G06T 5/00* (2013.01); *H04N 19/117* (2014.11); *H04N 19/134* (2014.11);
(Continued)

(58) Field of Classification Search
CPC .... H04N 19/176; H04N 19/86; H04N 19/117; H04N 19/134; H04N 19/00072; H04N 19/00066; H04N 19/0089; H04N 19/00909

See application file for complete search history.

(56) References Cited

U.S. PATENT DOCUMENTS 8,855,434 B2 *  10/2014  Sato ....................... H04N 19/60
                                                                                              382/232
2004/0208392 A1  10/2004  Raveendran et al.
(Continued)

FOREIGN PATENT DOCUMENTS

JP    2005 123732    5/2005
JP    2006 521065    9/2006
(Continued)

OTHER PUBLICATIONS

Office Action dated Jan. 28, 2014 in Japanese Patent Application No. 2010-090333.

(Continued)

*Primary Examiner* — Li Liu
(74) *Attorney, Agent, or Firm* — XSENSUS LLP

(57) ABSTRACT

It is configured such that decoded images with favorable image quality are obtained, even in the case of using extended macroblock sizes.

A deblocking filter 24 applies filtering to reduce blocking artifacts from an encoded stream in which image data has been encoded in individual blocks. A filter strength adjuster 41 adjusts the filter strength according to block sizes of the predictive image data. For example, during image encoding, the filter strength is adjusted according to the block size of the predictive image data yielding the best encoding efficiency generated using filtered and decoded image data. It may also be configured such that filtering is applied to remove blocking artifacts from decoded image data during image decoding, with the filter strength being adjusted according to the block sizes of the predictive image data.

14 Claims, 12 Drawing Sheets

Related U.S. Application Data continuation of application No. 13/581,960, filed as application No. PCT/JP2011/057997 on Mar. 30, 2011, now Pat. No. 9,077,989.

(51) Int. Cl.
*H04N 19/176* (2014.01)
*H04N 19/134* (2014.01)
*H04N 19/117* (2014.01)
*H04N 19/86* (2014.01)
*H04N 19/80* (2014.01)

(52) U.S. Cl.
CPC .......... *H04N 19/176* (2014.11); *H04N 19/80* (2014.11); *H04N 19/86* (2014.11)

(56) References Cited

U.S. PATENT DOCUMENTS

| | | |
|---|---|---|
| 2005/0078750 A1 | 4/2005 | Shen et al. |
| 2006/0140278 A1 | 6/2006 | Gomila et al. |
| 2007/0025448 A1 | 2/2007 | Cha et al. |
| 2007/0201564 A1 | 8/2007 | Joch et al. |
| 2008/0199090 A1 | 8/2008 | Tasaka et al. |
| 2010/0080472 A1 | 4/2010 | Asano |
| 2010/0135389 A1 | 6/2010 | Tanizawa et al. |
| 2011/0110603 A1 | 5/2011 | Ikai |

FOREIGN PATENT DOCUMENTS

| | | |
|---|---|---|
| JP | 2007-36463 A | 2/2007 |
| JP | 2008 205534 | 9/2008 |
| WO | 2009 001793 | 12/2008 |
| WO | 2010 001911 | 1/2010 |

OTHER PUBLICATIONS

International Search Report dated Jul. 5, 2011 in PCT/JP11/057997 Filed Mar. 30, 2011.

Peisong Chenn, et al., "Video Coding Using Extended Block Sizes", Qualcomm Inc., International Telecommunication Union, Study Group 16—Contribution 123, Jan. 2009, pp. 1-4.

Office Action dated May 27, 2014 in Japanese Patent Application No. 2010-090333.

* cited by examiner

IMAGE PROCESSING APPARATUS AND IMAGE PROCESSING METHOD

CROSS-REFERENCE TO RELATED APPLICATIONS

This application is a continuation of U.S. Ser. No. 14/710,769, filed May 13, 2015, which is a continuation of U.S. Ser. No. 13/581,960 filed Aug. 30, 2012, the entire contents of each of which are incorporated herein by reference, and claims the benefit of priority from, PCT Application No. PCT/JP11/057997 filed Mar. 30, 2011, and is further based upon, and claims the benefit of priority under 35 U.S.C. § 119 from, Japanese Patent Application No. 2010-090333 filed Apr. 9, 2010.

TECHNICAL FIELD

This invention relates to an image processing apparatus and an image processing method. Specifically, it is configured such that a decoded image with favorable image quality is obtained.

BACKGROUND ART

Recently, there has been a proliferation in broadcasting stations and general households of apparatus that digitally handle image information, and when so doing, compress images for the purpose of efficient information transfer and storage. Such apparatus compress images by implementing coding formats such as MPEG which compress information using an orthogonal transform such as the discrete cosine transform and by motion compensation.

Particularly, MPEG-2 (ISO/IEC 13818-2) is defined as a general-purpose image coding format, and is currently widely used in a broad range of applications for both professional use and consumer use. By using the MPEG-2 compression format, it is possible to realize favorable image quality by allocating a bit rate from 4 to 8 Mbps if given a standard-definition interlaced image having 720×480 pixels, for example. Additionally, it is possible to realize favorable image quality by allocating a bit rate from 18 to 22 Mbps if given a high-definition interlaced image having 1920×1088 pixels.

Although MPEG-2 has primarily targeted high image quality coding suitable for broadcasting, it is not compatible with coding formats having a bit rate lower than that of MPEG-1, or in other words a high compression rate. Due to the proliferation of mobile devices, it is thought that the need for such coding formats will increase in the future, and in response the MPEG-4 coding format has been standardized. MPEG-4 was designated an international standard for image coding in December 1998 as ISO/IEC 14496-2.

Furthermore, standardization of H.26L (ITU-T Q6/16 VCEG), which was initially for the purpose of image coding for videoconferencing, has been progressing recently. Compared to previous coding formats such as MPEG-2 and MPEG-4, H.26L is known to impose more computational demands for coding and decoding, but higher encoding efficiency is realized. Also, as a link to MPEG-4 activity, a format based on H.26L which realizes higher encoding efficiency is being currently standardized as the Joint Model of Enhanced-Compression Video Coding. As part of the standardization schedule, H.264 and MPEG-4 Part 10 (Advanced Video Coding, hereinafter abbreviated "H.264/AVC") was internationally standardized in March 2003.

Additionally, as an extension of the above, standardization of the FRExt (Fidelity Range Extension) was completed in February 2005. FRExt includes coding tools required for business use, such as RGB, 4:2:2, and 4:4:4, as well as the 8×8 DCT and quantization matrices defined in MPEG-2. As a result, H.264/AVC can be used for image coding able to favorably express even the film noise included in movies, which has led to its use in a wide range of applications such as Blu-Ray (trademark).

With such coding and decoding processes, image data is coded in units of blocks. Also, when decoding coded data, a filter is applied and deblocking is conducted on the basis of the boundary strength and the quantization parameters, as indicated in PTL 1, for example.

However, needs are growing for coding at even higher compression rates, such as for compressing images having approximately 4000×2000 pixels, or for delivering high-definition images in an environment of limited transmission capacity such as the Internet. Thus, extending the macroblock size beyond that of MPEG-2 and H.264/AVC to a size such as 32×32 pixels, for example, has been proposed in literature such as NPL 1. Namely, with the proposal in NPL 1, by adopting a tiered macroblock structure, larger blocks are defined as a superset while maintaining compatibility with the H.264/AVC format for blocks of 16×16 pixels or less.

CITATION LIST

Patent Literature

PTL 1: Japanese Unexamined Patent Application Publication No. 2007-36463

Non Patent Literature

NPL 1: "Video Coding Using Extended Block", (Study Group 16, Contribution 123, ITU, January 2009)

SUMMARY OF INVENTION

Technical Problem

However, blocking artifacts increase in the case of using extended macroblock sizes, particularly at low bit rates. For this reason, if a conventional deblocking filter is used to remove deblocking artifacts, there is a risk that the blocking artifacts will not be sufficiently removed, resulting in poorer image quality.

Accordingly, it is an object of the present invention to provide an image processing apparatus and image processing method by which decoded images with favorable image quality are obtained, even in the case of using extended macroblock sizes.

Solution to Problem

A first aspect of the present invention is an image processing apparatus provided with a decoder that generates decoded image data by decoding an encoded stream in which image data has been encoded in individual blocks, a filter that applies filtering to remove blocking artifacts from the decoded image data generated by the decoder, and a filter strength adjuster that adjusts the filter strength of the filtering according to the block sizes of neighboring blocks adjacent at a block boundary.

A second aspect of the present invention is an image processing apparatus provided with a filter that applies filtering to remove blocking artifacts from decoded image data, a filter strength adjuster that adjusts the filter strength of the filtering according to the block sizes of neighboring blocks adjacent at a block boundary, and an encoder that encodes image data by using decoded image data that has been filtered by the filter.

With this invention, filtering to remove blocking artifacts is applied to decoded image data that has been obtained by inverse quantizing quantized data generated by the encoding of image data and applying an inverse orthogonal transform to the inverse quantized data, or to decoded image data that has been obtained by inverse quantizing quantized data obtained by losslessly decoding an encoding stream and applying an inverse orthogonal transform to the inverse quantized data, for example. With the filtering, the filter strength is adjusted such that filtering is more readily applied to larger block sizes. With the filter strength adjustment, parameter values for adjusting the filter strength are configured according to block sizes. Also, the filter strength is adjusted according to the larger block size in the case where two neighboring blocks have different block sizes. Also, with the filter strength adjustment, the values of syntax elements in a coding standard are adjusted. For example, the filter strength may be adjusted by adjusting the values of FilterOffsetA and FilterOffsetB, which are specified by the syntax elements slice_alpha_c0_offset_div2 and slice_beta_offset_div2 in the H.264/AVC standard. Furthermore, when using parameter values that differ from preset parameter values, the value of the syntax element deblocking_filter_control_present_flag in the picture parameter set is set to a given value such as "1", and values for FilterOffsetA and FilterOffsetB are stated in the slice header.

A third aspect of the present invention is an image processing method provided with a step that generates decoded image data by decoding an encoded stream in which image data has been encoded in individual blocks, a step that applies filtering to remove blocking artifacts from the decoded image data generated by the decoder, and a step that adjusts the filter strength of the filtering according to the block sizes of neighboring blocks adjacent at a block boundary.

A fourth aspect of the present invention is an image processing method provided with a step that applies filtering to remove blocking artifacts from decoded image data, a step that adjusts the filter strength of the filtering according to the block sizes of neighboring blocks adjacent at a block boundary, and a step that encodes image data by using decoded image data that has been filtered by the filter.

Advantageous Effects of Invention

According to the invention, the filter strength is adjusted according to the block sizes of neighboring blocks adjacent at a block boundary when applying filtering to remove blocking artifacts from decoded image data. For this reason, the filter strength is adjusted according to the block size even if macroblocks of extended size are used, and thus a decoded image with reduced blocking artifacts and favorable image quality is obtained.

DESCRIPTION OF EMBODIMENTS

Figure 1:
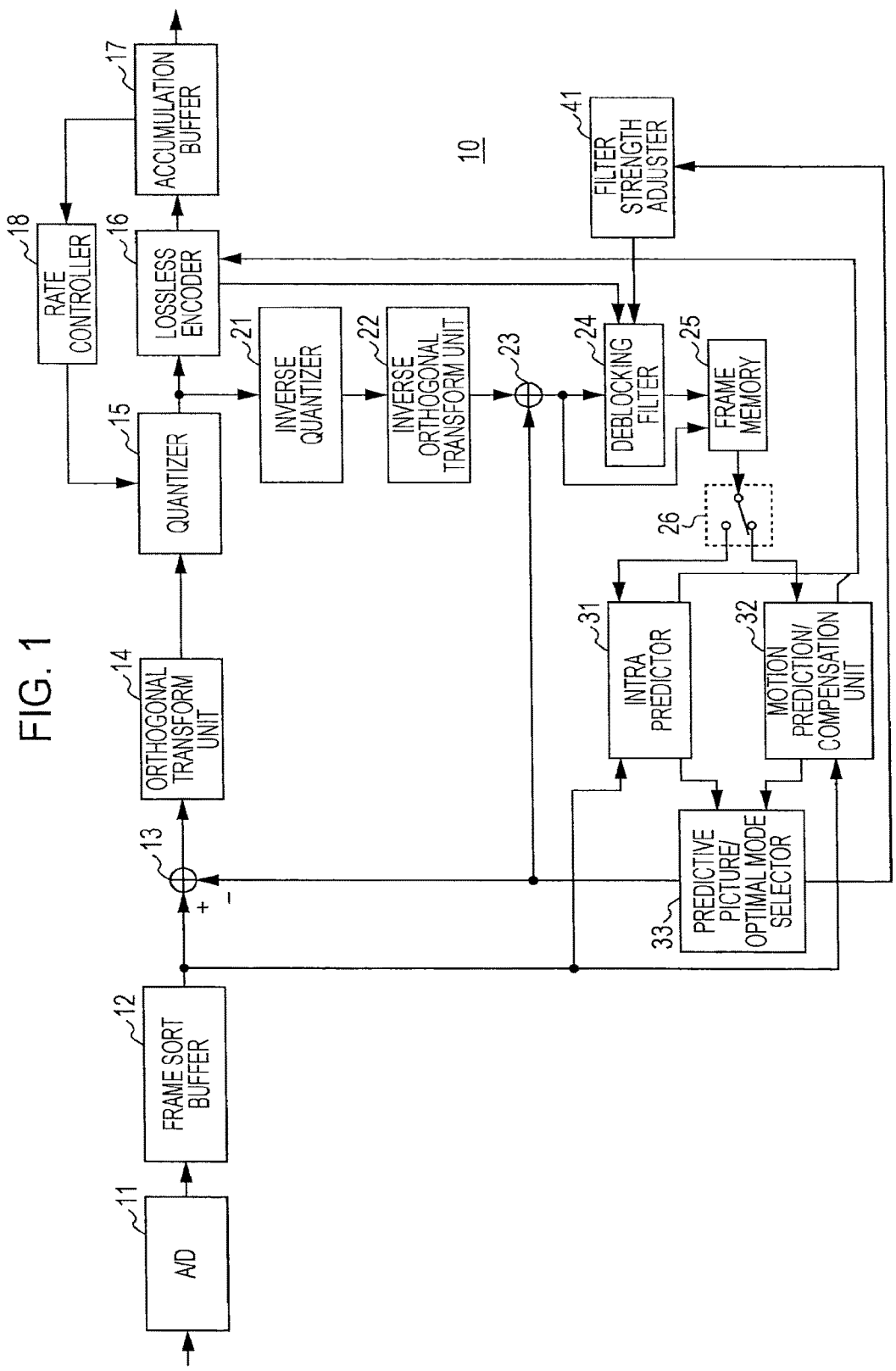
FIG. 1 is a diagram illustrating a configuration of an image encoding apparatus.

Hereinafter, embodiments for carrying out the present invention will be described. An image processing apparatus of the present invention is applicable to an image encoding apparatus that encodes image data on a per-block basis, and to an image decoding apparatus that decodes an encoded stream in which image data has been encoded on a per-block basis. The case of an image processing apparatus of the present invention being applied to an image processing apparatus and the case of being applied to an image decoding apparatus will be described in the following order.

1. Configuration of image encoding apparatus
2. Filtering by deblocking filter
3. Configuration of deblocking filter and filter strength adjuster in image encoding apparatus
4. Operation of image encoding apparatus
5. Configuration of image decoding apparatus
6. Operation of image decoding apparatus <1. Configuration of Image Encoding Apparatus>

FIG. 1 illustrates a configuration of an image encoding apparatus. The image encoding apparatus 10 is provided with an analog/digital converter (A/D converter) 11, a frame sort buffer 12, a subtractor 13, an orthogonal transform unit 14, a quantizer 15, a lossless encoder 16, an accumulation buffer 17, and a rate controller 18. Additionally, the image encoding apparatus 10 is provided with an inverse quantizer 21, an inverse orthogonal transform unit 22, an adder 23, a deblocking filter 24, frame memory 25, a selector 26, an intra predictor 31, a motion prediction/compensation unit 32, and a predictive image/optimal mode selector 33.

The A/D converter 11 converts an analog image signal into digital image data, which is output to the frame sort buffer 12.

The frame sort buffer 12 sorts image data output from the A/D converter 11 in a frame order. The frame sort buffer 12 sorts frames according to the GOP (Group of Pictures) structure given by the encoding process, and outputs sorted image data to the subtractor 13, the intra predictor 31, and the motion prediction/compensation unit 32.

The subtractor 13 is supplied with image data output from the frame sort buffer 12 and predictive image data selected by the predictive image/optimal mode selector 33 discussed later. The subtractor 13 computes prediction error data, being the difference between the image data output from the frame sort buffer 12 and the predictive image data supplied by the predictive image/optimal mode selector 33, and outputs the prediction error data to the orthogonal transform unit 14.

The orthogonal transform unit 14 applies an orthogonal transform such as the discrete cosine transform (DCT) or the Karhunen-Loeve transform to the prediction error data output from the subtractor 13. The orthogonal transform unit 14 outputs transform coefficient data obtained by the orthogonal transform to the quantizer 15.

The quantizer 15 is supplied with transform coefficient data output from the orthogonal transform unit 14 and a rate control signal from the rate controller 18 discussed later. The quantizer 15 quantizes the transform coefficient data, and outputs quantized data to the lossless encoder 16 and the inverse quantizer 21. The quantizer 15 also switches a quantization parameter (quantization scale) on the basis of a rate control signal from the rate controller 18, thereby changing the bit rate of quantized data.

The lossless encoder 16 is supplied with quantized data output from the quantizer 15 and prediction mode information from the intra predictor 31, the motion prediction/compensation unit 32, and the predictive image/optimal mode selector 33 discussed later. Herein, prediction mode information may include a macroblock type by which the prediction block size can be identified, a prediction mode, motion vector information, and reference picture information, for example, depending on whether the prediction mode is intra prediction or inter prediction. The lossless encoder 16 losslessly encodes quantized data by variable-length encoding or arithmetic coding, for example, and generates an encoded stream which is output to the accumulation buffer 17. The lossless encoder 16 also losslessly encodes prediction mode information, which is added to the encoded stream header information.

The accumulation buffer 17 buffers the encoded stream from the lossless encoder 16. The accumulation buffer 17 also outputs the buffered encoded stream at a transmission rate that depends on the transmission channel.

The rate controller 18 monitors the amount of free space in the accumulation buffer 17, generates a rate control signal depending on the amount of free space, and outputs the rate control signal to the quantizer 15. The rate controller 18 acquires information indicating the amount of free space from the accumulation buffer 17, for example. When the amount of free space runs low, the rate controller 18 lowers the bit rate of quantized data with a rate control signal. Also, when there is a sufficiently large amount of free space in the accumulation buffer 17, the rate controller 18 raises the bit rate of quantized data with a rate control signal.

The inverse quantizer 21 inverse quantizes quantized data supplied from the quantizer 15. The inverse quantizer 21 outputs transform coefficient data obtained by the inverse quantization to the inverse orthogonal transform unit 22.

The inverse orthogonal transform unit 22 applies an inverse orthogonal transform to the transform coefficient data supplied from the inverse quantizer 21, and outputs the data obtained thereby to the adder 23.

The adder 23 adds together data from the inverse orthogonal transform unit 22 and predictive image data supplied from the predictive image/optimal mode selector 33 to generate decoded image data, which is output to the deblocking filter 24 and the frame memory 25.

The deblocking filter 24 applies a filter to reduce blocking artifacts produced during image encoding. The deblocking filter 24 applies a filter to remove blocking artifacts from the decoded image data supplied from the adder 23, and outputs the filtered and decoded image data to the frame memory 25. The deblocking filter 24 also adjusts the filter strength on the basis of parameter values supplied from a filter strength adjuster 41 discussed later.

The frame memory 25 stores the decoded image data supplied from the adder 23 and the filtered and decoded image data supplied from the deblocking filter 24.

The selector 26 supplies unfiltered decoded image data read out from the frame memory 25 to the intra predictor 31 for intra prediction. The selector 26 also supplies filtered decoded image data read out from the frame memory 25 to the motion prediction/compensation unit 32 for inter prediction.

The intra predictor 31 conducts an intra prediction process in all candidate intra prediction modes using image data of the encoding target image output from the frame sort buffer 12 as well as unfiltered decoded image data read out from the frame memory 25. In addition, the intra predictor 31 computes a cost function value for each intra prediction mode, and selects the intra prediction mode yielding the minimum computed cost function value, or in other words the intra prediction mode yielding the best encoding efficiency, as the optimal intra prediction mode. The intra predictor 31 outputs predictive image data generated with the optimal intra prediction mode, prediction mode information regarding the optimal intra prediction mode, and the cost function value of the optimal intra prediction mode to the predictive image/optimal mode selector 33. Also, in order to obtain the bit rate used in the computation of the cost function value as discussed later, the intra predictor 31 outputs prediction mode information regarding the intra prediction mode to the lossless encoder 16 when intra predicting in each intra prediction mode.

The motion prediction/compensation unit 32 applies motion prediction/compensation to all prediction block sizes corresponding to macroblocks. The motion prediction/compensation unit 32 uses the filtered decoded image read out from the frame memory 25 to detect a motion vector for each image block given by the respective prediction block sizes in an encoding target image read out from the frame sort buffer 12. Additionally, the motion prediction/compensation unit 32 applies motion compensation to the decoded image on the basis of the detected motion vectors to generate a predictive image. The motion prediction/compensation unit 32 also computes a cost function value for each prediction block size, and selects the prediction block size yielding the minimum computed cost function value, or in other words the prediction block size yielding the best encoding efficiency, as the optimal inter prediction mode. The motion prediction/compensation unit 32 outputs predictive image data generated with the optimal inter prediction mode, prediction mode information regarding the optimal inter prediction mode, and the cost function value of the optimal inter prediction mode to the predictive image/optimal mode selector 33. Also, in order to obtain the bit rate used in the computation of the cost function value as discussed later, the motion prediction/compensation unit 32 outputs prediction mode information regarding the inter prediction mode to the lossless encoder 16 when inter predicting with each prediction block size. Note that the motion prediction/compensation unit 32 also predicts using skipped macroblocks and direct mode as inter prediction modes.

The predictive image/optimal mode selector 33 compares cost function values supplied from the intra predictor 31 to cost function values supplied from the motion prediction/ compensation unit 32 at the macroblock level, and selects the prediction mode with the lower cost function value as the optimal mode with the best encoding efficiency. The predictive image/optimal mode selector 33 also outputs predictive image data generated with the optimal mode to the subtractor 13 and the adder 23. Additionally, the predictive image/optimal mode selector 33 outputs prediction mode information regarding the optimal mode to the lossless encoder 16 and the filter strength adjuster 41. Herein, the predictive image/optimal mode selector 33 conducts intra prediction or inter prediction at the slice level.

The filter strength adjuster 41 configures parameter values for adjusting the filter strength according to the prediction block size indicated by the prediction mode information regarding the optimal mode, and outputs the configured parameter values to the deblocking filter 24.

<2. Filtering by Deblocking Filter>

When filtering with a deblocking filter it is possible to specify three types of filtering:

(a) filter block boundaries as well as macroblock boundaries (b) filter macroblock boundaries only (c) do not filter These three types of filtering are specified according to two parameters in the H.264/AVC coding format, deblocking_filter_control_present_flag in the Picture Parameter Set RBSP and disable_deblocking_filter_idc in the slice header included in the image compression information.

Regarding the quantization parameter QP, QPY is used in the case of applying the following process to luminance data, whereas QPC is used in the case of applying to chrominance data. Also, for motion vector coding, intra prediction, and entropy coding (CAVLC/CABAC), pixel values belonging to different slices are processed as "not available". Furthermore, for filtering, pixel values are processed as "available" if they belong to the same picture, even if the pixel values belong to different slices.

In the following explanation, unfiltered pixel data at the block boundary between neighboring blocks P and Q are taken to be p0 to p3 and q0 to q3, as illustrated by (A) in FIG. 2. Also, filtered pixel data is taken to be p0' to p3' and q0' to q3', as illustrated by (B) in FIG. 2.

Figure 2:
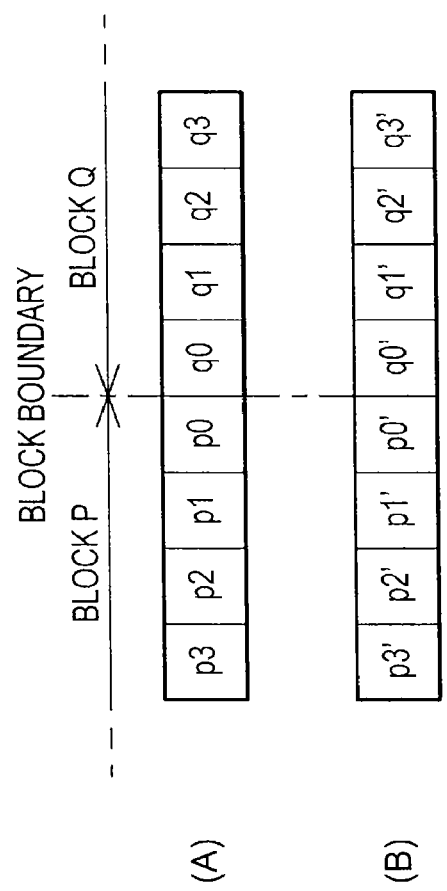
FIG. 2 is a diagram illustrating pixel data used for filtering by a deblocking filter.

Prior to filtering, block boundary strength data Bs (Boundary Strength) is defined as indicated in Table 1 for the pixels p and the pixels q in FIG. 2.

TABLE 1

| | |
|---|---|
| Either p or q belongs to intra macroblock, and in addition, is positioned at the macroblock boundary. | Bs = 4 (Strongest Filtering) |
| Either p or q belongs to intra macroblock, but is not positioned at the macroblock boundary. | Bs = 3 |
| Neither p nor q belongs to intra macroblock, and in addition, either p or q has a transform coefficient. | Bs = 2 |
| Neither p nor q belongs to intra macroblock and neither has a transform coefficient; however, the references frames differ, the number of reference frames differs, or the MV values differ. | Bs = 1 |
| Neither q nor q belongs to intra macroblock and neither has a transform coefficient. Reference frames and MV values are identical. | Bs = 0 (No Filtering) |

As illustrated in Table 1, the block boundary strength data Bs is assigned the highest filter strength of "4" in the case where either a pixel p or a pixel q belongs to the macroblock MB to be intra coded, and in addition, that pixel is positioned at the boundary of the macroblock MB.

The block boundary strength data Bs is assigned a filter strength of "3", the next-highest after "4", in the case where either a pixel p or a pixel q belongs to the macroblock MB to be intra coded, but in addition, that pixel is not positioned at the boundary of the macroblock MB.

The block boundary strength data Bs is assigned a filter strength of "2", the next-highest after "3", in the case where neither a pixel p nor a pixel q belongs to the macroblock MB to be intra coded, and in addition, some of the pixels have transform coefficients.

The block boundary strength data Bs is assigned a filter strength of "1" in the case of satisfying a condition wherein neither a pixel p nor a pixel q belongs to the macroblock MB to be intra coded, and in addition, none of the pixels have transform coefficients, while also satisfying a condition wherein the reference frames differ, the number of reference frames differ, or the motion vectors differ.

The block boundary strength data Bs is assigned a filter strength of "0", meaning that filtering is not applied, in the case where neither a pixel p nor a pixel q belongs to the macroblock MB to be intra coded and neither have transform coefficients, but the reference frames and motion vectors are the same.

Filtering is applied to (p2, p1, p0, q0, q1, q2) in FIG. 2 only in the case where the condition in Eq. (1) is established.

$$Bs>0$$

$$|p0-q0|<\alpha; |p1-p0|<\beta; |q1-q0|<\beta \qquad (1)$$

Figure 3:
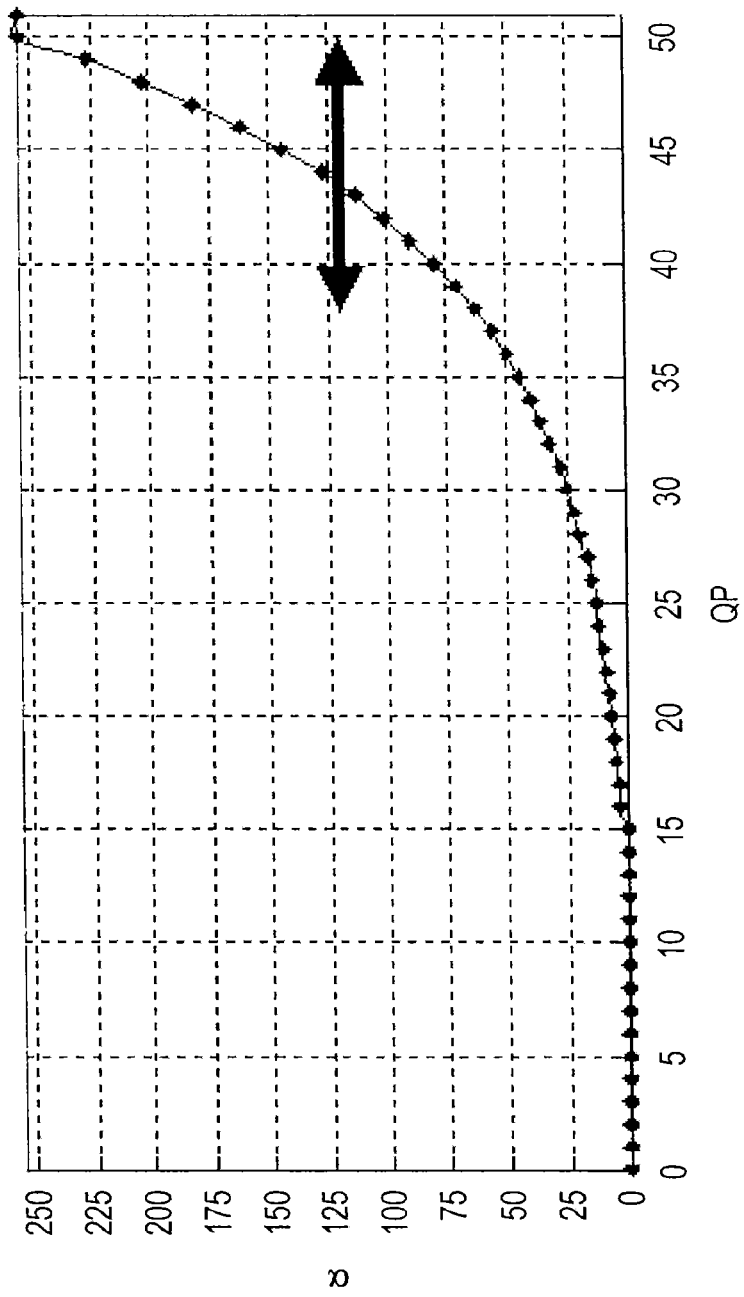
FIG. 3 is a diagram illustrating the relationship between a quantization parameter QP and a threshold value α.

Herein, the threshold values $\alpha$ and $\beta$ are parameter values that adjust the filter strength, or in other words, how readily the filter is applied. By default, the values of $\alpha$ and $\beta$ are determined according to the quantization parameter QP as follows. It is also possible for the user to adjust the strength with the two parameters slice_alpha_c0_offset_div2 and slice_beta_offset_div2 included in the slice header of the image compression information. Herein, FIG. 3 illustrates the relationship between the quantization parameter QP and the threshold value $\alpha$. FIG. 3 demonstrates how the filter strength is adjusted because of the way the curve, which illustrates the relationship between the quantization parameter QP and the threshold value $\alpha$, moves in the direction of the arrow as an offset is added to the quantization parameter QP.

Also, the threshold values $\alpha$ and $\beta$ are taken from the table illustrated in Table 2 by computing indexA and indexB from Eqs. (2) to (4) using quantization parameters qPp and qPq for the neighboring blocks P and Q, respectively.

$$qPav=(qPp+qPq+1)>>1 \qquad (2)$$

$$indexA=\text{Clip3}(0,51,qPav+\text{FilterOffset}A) \qquad (3)$$

$$indexB=\text{Clip3}(0,51,qPav+\text{FilterOffset}B) \qquad (4)$$

TABLE 2

| | indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |
| | indexA (for α) or indexB (for β) | | | | | | | | | | | | | | | | | | | | | | | | | |
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

Different filtering methods are defined for the case where "Bs<4" and the case where "Bs=4". First, the case where "Bs<4" will be described.

The deblocking filter conducts the operations indicated by Eqs. (5) to (7) and computes filtered pixel data p0' and q0'. In Eq. (7), Clip3 represents a clipping process.

$$p0'=\text{Clip1}(p0+\Delta) \quad (5)$$

$$q0'=\text{Clip1}(q0+\Delta) \quad (6)$$

$$\Delta=\text{Clip3}(-tc,tc,((((q0-p0)<<2)+(p1-q1)+4)>>3)) \quad (7)$$

The deblocking filter computes "tc" in Eq. (7) on the basis of Eq. (8) in the case where chromaEdgeFlag is "0", and on the basis of Eq. (9) in all other cases.

In Eq. (8), "( )?1:0" represents 1 if the condition in parenthesis ( ) is satisfied, and represents "0" all other cases.

$$tc=tc0+((ap<\beta)?1:0)+((aq<\beta)?1:0) \quad (8)$$

$$tc=tc0+1 \quad (9)$$

The value of tc is defined according to the values of Bs and indexA as in Table 3.

The deblocking filter computes filtered pixel data q1' by conducting the operations indicated in Eq. (14) in the case where chromaEdgeFlag is "0", and in addition, aq is less than or equal to "β". In all other cases, the filtered pixel data q1' is obtained by Eq. (15).

$$q1'=q1+\text{Clip3}(-tc0,tc0,(q2+((p0+q0+1)>>1)-(q1<<1))>>1) \quad (14)$$

$$q1'=q1 \quad (15)$$

Next, the case where "Bs=4" will be described. The deblocking filter computes pixel data p0', p1', and p2' in accordance with Eqs. (17) to (19) in the case where chromaEdgeFlag indicates "0", and in addition, the condition in Eq. (16) is satisfied.

$$ap<\beta\&\&|p0-q0|<((\alpha>>2)+2) \quad (16)$$

$$p0'=(p2+2\cdot p1+2\cdot p0+2\cdot q0+q1+4)>>3 \quad (17)$$

$$p1'=(p2+p1+p0+q0+2)>>2 \quad (18)$$

$$p2'=(2\cdot p3+3\cdot p2+p1+p0+q0+4)>>3 \quad (19)$$

TABLE 3

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| bS = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS = 2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS = 3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |
| | indexA | | | | | | | | | | | | | | | | | | | | | | | | | |
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| bS = 1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bS = 2 | 1 | 1 | 1 | 1 | 1 | 1 | 2 | 2 | 2 | 3 | 3 | 3 | 4 | 4 | 5 | 5 | 6 | 7 | 8 | 8 | 10 | 11 | 12 | 13 | 15 | 17 |
| bS = 3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

Also, the deblocking filter computes ap and aq in Eq. (8) in accordance with Eqs. (10) and (11).

$$ap=|p2-p0| \quad (10)$$

$$aq=|q2-q0| \quad (11)$$

The deblocking filter computes filtered pixel data p1' by conducting the operations indicated in Eq. (12) in the case where chromaEdgeFlag is "0", and in addition, ap is less than or equal to "β". In all other cases, the filtered pixel data p1' is obtained by Eq. (13).

$$p1'=p1+\text{Clip3}(-tc0,tc0,(p2+((p0+q0+1)>>1)-(p1<<1))>>1) \quad (12)$$

$$p1'=p1 \quad (13)$$

The deblocking filter computes pixel data p0', p1', and p2' in accordance with Eqs. (20) to (22) in the case where chromaEdgeFlag indicates "0", and in addition, the condition in Eq. (16) is not satisfied.

$$p0'=(2\cdot p1+p0+q1+2)>>2 \quad (20)$$

$$p1'=p1 \quad (21)$$

$$p2'=p2 \quad (22)$$

The deblocking filter computes pixel data q0', q1', and q2' in accordance with Eqs. (24) to (26) in the case where chromaEdgeFlag indicates "0", and in addition, the condition in Eq. (23) is satisfied.

$$aq<\beta\&\&|p0-q0|<((\alpha>>2)+2) \quad (23)$$

$$q0'=(p1+2\cdot p0+2\cdot q0+2\cdot q1+q2+4)>>3 \quad (24)$$

$$q1'=(p0+q0+q1+q2+2)>>2 \quad (25)$$

$$q2'=(2\cdot q3+3\cdot q2+q1+q0+p4+4)>>3 \quad (26)$$

The deblocking filter computes pixel data q0', q1', and q2' in accordance with Eqs. (27) to (29) in the case where chromaEdgeFlag indicates "0", and in addition, the condition in Eq. (23) is not satisfied.

$$q0'=(2\cdot q1+q0+p1+2)>>2 \quad (27)$$

$$q1'=q1 \quad (28)$$

$$q2'=q2 \quad (29)$$

<3. Configuration of Deblocking Filter and Filter Strength Adjuster in Image Encoding Apparatus>

The filter strength adjuster 41 adjusts the filter strength of the deblocking filter 24 according to the prediction block size of the optimal mode for a given macroblock.

Typically, blocking artifacts are more humanly visible in the case of larger block sizes. Also, larger block sizes are more readily selected for flat areas that do not contain much texture information.

Also, although blocking artifacts are removed if the filter strength of the deblocking filter is strengthened, at the same time there is a problem in that the sharpness of the image is lost since the filtering by a deblocking filter is a low-pass filter.

Accordingly, if for example it is configured such that the filter is more readily applied to blocks using larger prediction block sizes which do not contain much texture information originally, then it becomes possible to remove easily visible blocking artifacts with little effect on texture, and obtain a decoded image with favorable image quality.

The filter strength adjuster 41 adjusts the filter strength of the deblocking filter 24 by configuring parameter values that adjust the filter strength according to the prediction block size.

Furthermore, it is not always the case that two neighboring blocks will have equal prediction block sizes. Consequently, in the case where the prediction block size is an extended block size in the optimal mode for either the target block or a neighboring block, the filter strength adjuster 41 adjusts the filter strength according to the larger prediction block size.

Additionally, in the case where a plurality of macroblocks with a larger block size than a given macroblock are used, the filter strength adjuster 41 adjusts the filter strength according to a combination of the prediction block sizes for two neighboring blocks, such that the filter strength is increased as the block size increases.

Figure 4:
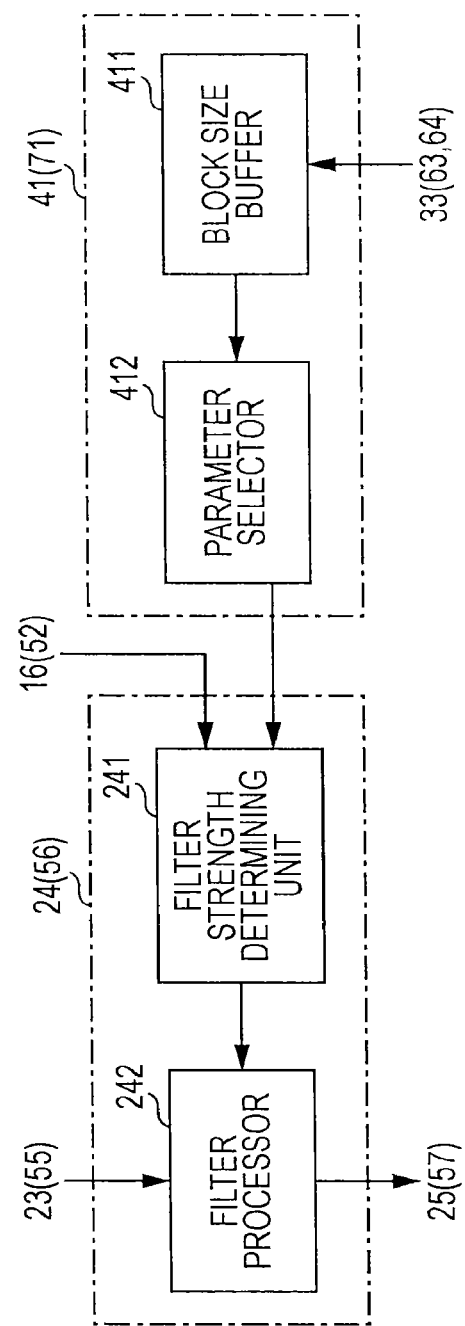
FIG. 4 is a diagram illustrating a configuration of a deblocking filter and a filter strength adjuster.

FIG. 4 illustrates a configuration of a deblocking filter and a filter strength adjuster. The filter strength adjuster 41 is provided with a block size buffer 411 and a parameter selector 412. The block size buffer 411 buffers one frame image's worth of information indicating the prediction block size of the optimal mode selected by the predictive image/optimal mode selector 33. In other words, a state is entered in which the block size buffer 411 stores information regarding the prediction block sizes of respective macroblocks in a single frame image to be encoded.

The parameter selector 412 configures the parameter values on the basis of prediction block size information in the block size buffer 411, such that filtering is more readily applied to the parts of the decoded image with larger block sizes. The parameter selector 412 may for example set larger values for the values of FilterOffsetA and FilterOffsetB, which are specified by the syntax elements slice_alpha_c0_offset_div2 and slice_beta_offset_div2 in the H.264/AVC standard. The parameter selector 412 also configures FilterOffsetA and FilterOffsetB in advance according to combinations of neighboring prediction block sizes, and determines what kind of prediction block sizes neighboring blocks have on the basis of prediction block size information. In addition, it is configured such that values which depend on combinations of determined prediction block sizes are used.

Furthermore, the parameter selector 412 computes indexA and indexB from the earlier Eqs. (2) to (4) and uses the table illustrated in Table 2 to configure the threshold values $\alpha$ and $\beta$, i.e., the parameter values that set the filter strength, according to the prediction block size, which are then output to the filter strength determining unit 241 of the deblocking filter 24.

The filter strength determining unit 241 determines block boundary strength data Bs on the basis of prediction mode information supplied from the lossless encoder 16, and outputs the determined block boundary strength data Bs as well as the threshold values $\alpha$ and $\beta$ supplied from the parameter selector 412 to the filter processor 242.

The filter processor 242 conducts the above-described filter operations using the block boundary strength data Bs, the threshold values $\alpha$ and $\beta$ and pixel data p3, p2, p1, p0, q0, q1, q2, and q3 at the block boundary, and computes filtered pixel data p3', p2', p1', p0', q0', q1', q2', and q3'.

<4. Operation of Image Encoding Apparatus>

Figure 5:
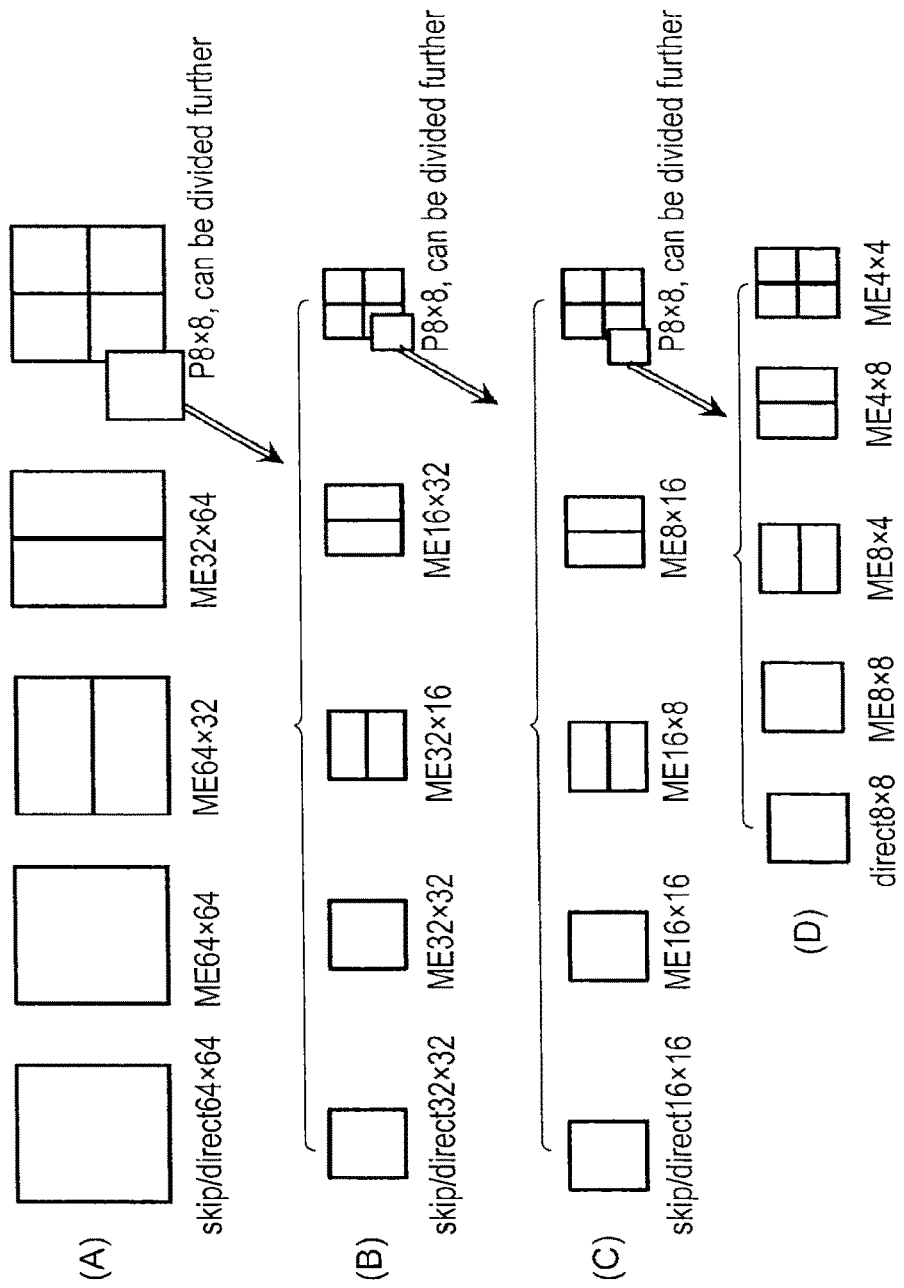
FIG. 5 is a diagram illustrating prediction block sizes used in an image encoding process.

Next, image encoding processing operations will be described. FIG. 5 illustrates prediction block sizes used in an image encoding process. In the H.264/AVC format, prediction block sizes from 16×16 pixels to 4×4 pixels are defined as illustrated by (C) and (D) in FIG. 5. Also, in the case of using macroblocks with sizes extended beyond that of the H.264/AVC format, such as the case of using 32×32 pixel macroblocks, for example, the prediction block sizes illustrated by (B) in FIG. 5 are defined, for example. Also, in the case of using 64×64 pixel macroblocks, for example, the prediction block sizes illustrated by (A) in FIG. 5 are defined, for example.

In FIG. 5, "skip/direct" indicates a prediction block size when skipped macroblocks or direct mode is selected in the motion prediction/compensation unit 32. Also, "ME" indicates a motion compensation block size. Also, "P8×8" indicates that a macroblock can be divided further at a lower layer with macroblocks of smaller size.

Meanwhile, standardization of a coding format called HEVC (High Efficiency Video Coding) has been progressing under work by the JCTVC (Joint Collaboration Team-Video Coding), a joint standardization group between the ITU-T and the ISO/IEC, with the aim of further improving the coding efficiency over the H.264/AVC format. As of September 2010, "Test Model under Consideration" (JCTVC-B205) has been published as a draft.

With the HEVC coding format, a CU (Coding Unit) is defined, making it possible to use macroblocks with sizes extended beyond that of H.264/AVC.

A CU, also called a CTB (Coding Tree Block), fulfills a similar role to a macroblock in the H.264/AVC format. Also, whereas macroblocks are fixed at a size of 16×16 pixels in the H.264/AVC format, with the HEVC coding format the size is not fixed and is specified in the image compression information in respective sequences.

Particularly, the CU with the largest size is called the LCU (Largest Coding Unit). Also, the CU with the smallest size is called the SCU (Smallest Coding Unit). While these sizes are specified in the sequence parameter set contained in the image compression information, they are each limited to being square sizes expressed by a power of 2.

Figure 6:
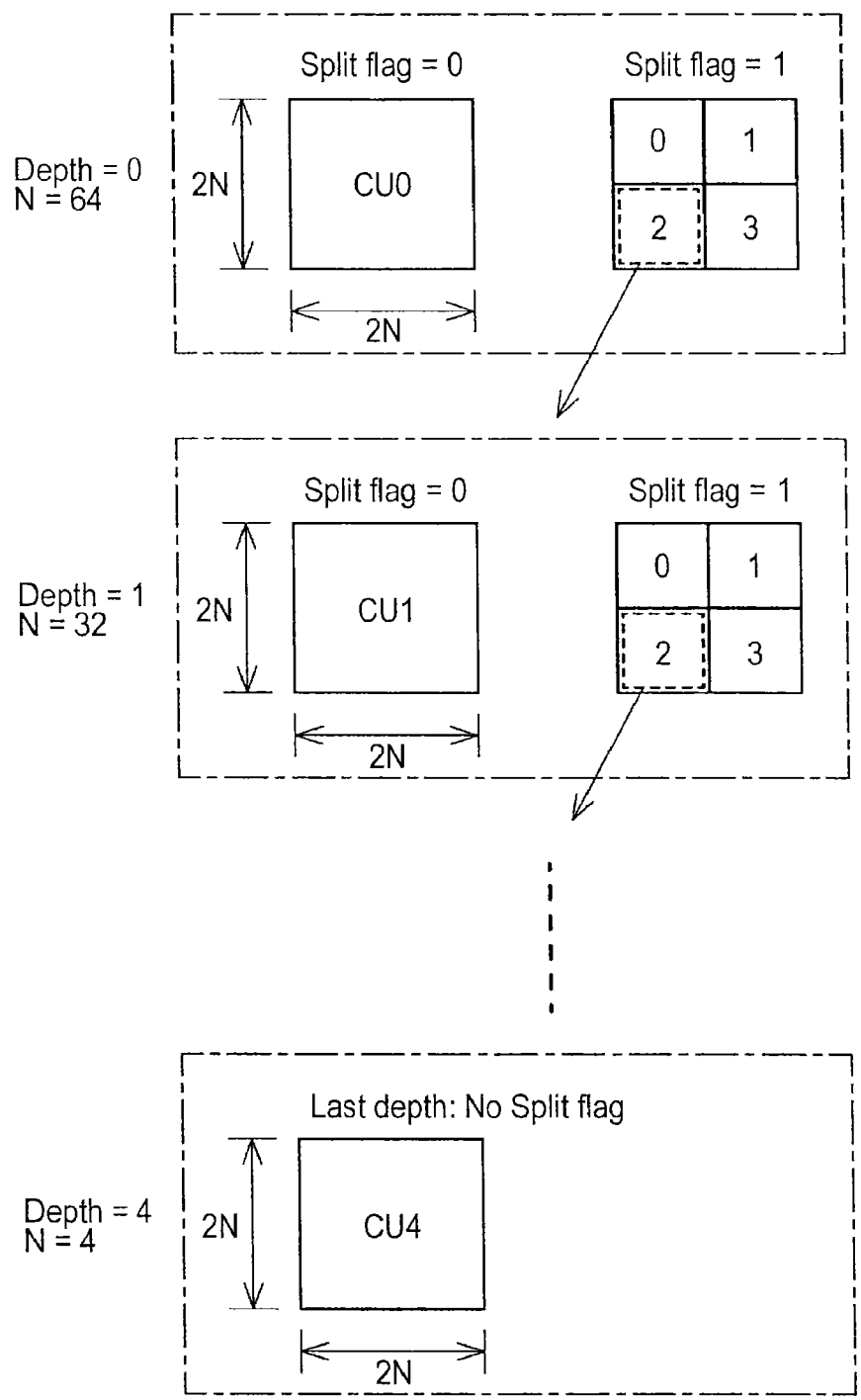
FIG. 6 is a diagram illustrating exemplary CUs defined by the HEVC coding format.

FIG. 6 illustrates exemplary CUs defined by the HEVC coding format. In the example illustrated, the size of the LCU is 128, and the maximum layer depth is 5. When the value of split_flag is 1, a CU of size 2N×2N is split into CUs of size N×N one layer below.

Additionally, a CU is split into PUs (Prediction Units), which are the units of intra or inter prediction, and TUs (Transform Units), which are the units of orthogonal transform.

A CU is additionally split into PUs, which are the units of intra or inter prediction, or alternatively TUs, which are the units of orthogonal transform, and a prediction process and orthogonal transform process are conducted. At present, with the HEVC coding format it is possible to use 16×16 as well as 32×32 orthogonal transform in addition to 4×4 and 8×8.

In this specification, blocks and macroblocks include the concepts of CUs, PUs, and TUs as discussed above, and are not limited to blocks of fixed size.

Figure 7:
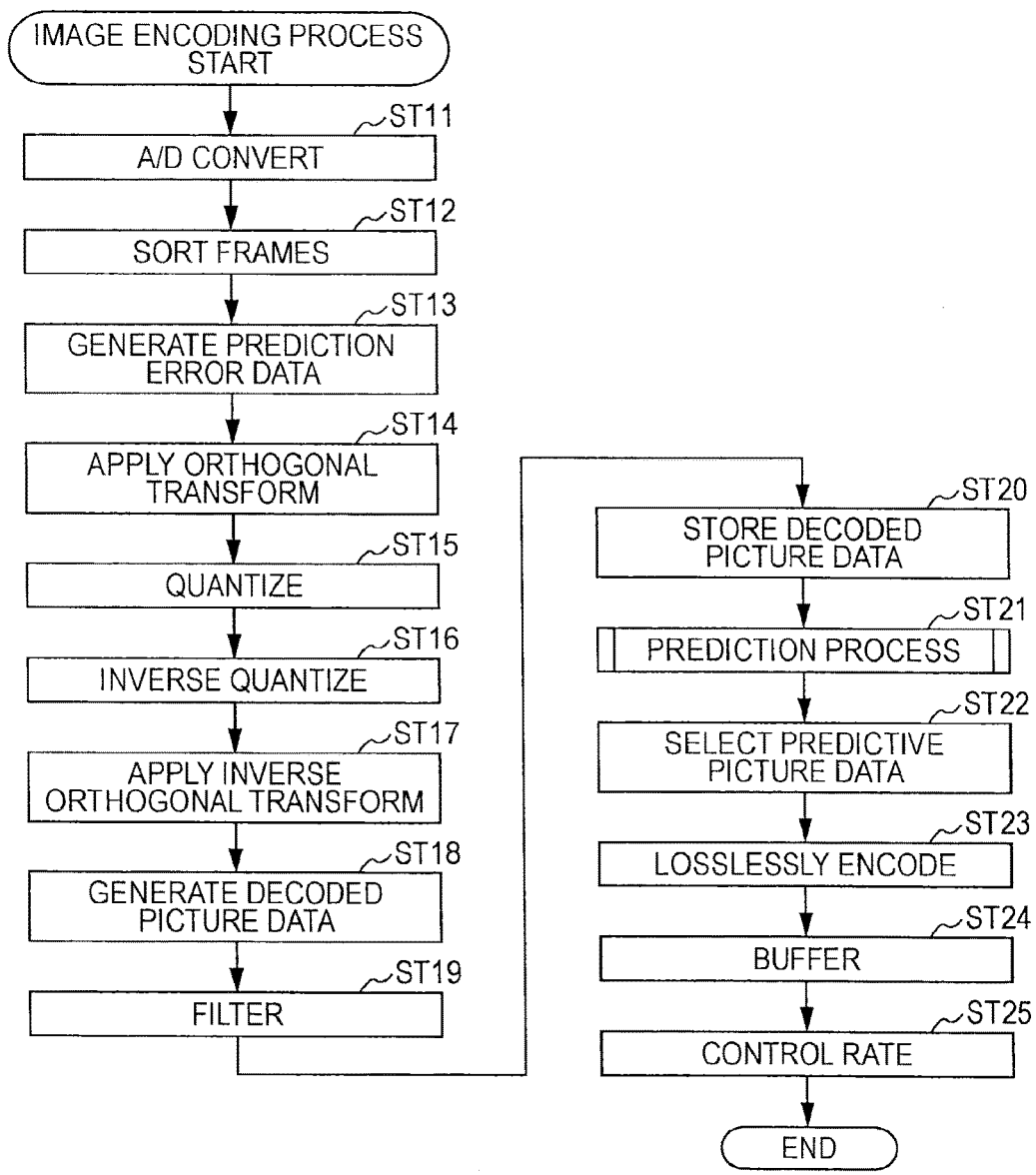
FIG. 7 is a flowchart illustrating image encoding processing operations.

FIG. 7 is a flowchart illustrating image encoding processing operations. In step ST11, the A/D converter 11 A/D converts an input image signal.

In step ST12, the frame sort buffer 12 sorts images. The frame sort buffer 12 stores image data supplied by the A/D converter 11, resorting pictures from their display order to an encoding order.

In step ST13, the subtractor 13 generates prediction error data. The subtractor 13 generates prediction error data by computing the difference between the image data of an image sorted in step ST12 and predictive image data supplied by the predictive picture/optimal mode selector 33. Prediction error data has a smaller data size compared to the original image data. Consequently, the data size can be compressed compared to the case of encoding images directly. Herein, when the selection between a predictive image supplied from the intra predictor 31 and a predictive image supplied from the motion prediction/compensation unit 32 is conducted in units of slices by the predictive image/optimal mode selector 33, intra prediction is conducted on slices for which a predictive image supplied from the intra predictor 31 is selected. Meanwhile, inter prediction is conducted on slices for which a predictive image from the motion prediction/compensation unit 32 is selected.

In step ST14, the orthogonal transform unit 14 applies an orthogonal transform. The orthogonal transform unit 14 applies an orthogonal transform to prediction error data supplied from the subtractor 13. Specifically, an orthogonal transform such as the discrete cosine transform or the Karhunen-Loeve transform is applied to prediction error data, and transform coefficient data is output.

In step ST15, the quantizer 15 conducts quantization. The quantizer 15 quantizes transform coefficient data. During quantization, rate control is applied as described later in the processing in step ST25.

In step ST16, the inverse quantizer 21 conducts inverse quantization. The inverse quantizer 21 inverse quantizes transform coefficient data that has been quantized by the quantizer 15, using characteristics that correspond to the characteristics of the quantizer 15.

In step ST17, the inverse orthogonal transform unit 22 applies an inverse orthogonal transform. The inverse orthogonal transform unit 22 applies an inverse orthogonal transform to transform coefficient data that has been inverse quantized by the inverse quantizer 21, using characteristics that correspond to the characteristics of the orthogonal transform unit 14.

In step ST18, the adder 23 generates decoded image data. The adder 23 generates decoded image data by adding together predictive image data supplied from the predictive image/optimal mode selector 33 and inverse orthogonally transformed data at a position corresponding to that predictive image.

In step ST19, the deblocking filter 24 applies filtering. The deblocking filter 24 filters decoded image data output by the adder 23 to remove blocking artifacts.

In step ST20, the frame memory 25 stores decoded image data. The frame memory 25 stores unfiltered decoded image data and filtered decoded image data.

In step ST21, the intra predictor 31 and the motion prediction/compensation unit 32 conduct respective prediction processes. Namely, the intra predictor 31 conducts intra prediction in intra prediction modes, while the motion prediction/compensation unit 32 conducts motion prediction/compensation in inter prediction modes. Details of the prediction processes will be discussed later with reference to FIG. 8, but as a result of these processes, prediction is conducted in all candidate prediction modes, and cost function values are respectively computed for all candidate prediction modes. Then, an optimal intra prediction mode and an optimal inter prediction mode are selected on the basis of the computed cost function values, and predictive images generated with the selected prediction modes as well as their cost function values and prediction mode information are supplied to the predictive image/optimal mode selector 33.

In step ST22, the predictive image/optimal mode selector 33 selects predictive image data. The predictive image/optimal mode selector 33 determines the optimal mode with the best encoding efficiency on the basis of the respective cost function values output by the intra predictor 31 and the motion prediction/compensation unit 32. Additionally, the predictive image/optimal mode selector 33 selects the predictive image of the optimal mode thus determined, and supplies it to the subtractor 13 and the adder 23. This predictive image is used in the operations in steps ST13 and ST18, as discussed above. Meanwhile, the prediction mode information corresponding to the selected predictive image data is output to the lossless encoder 16 and the filter strength adjuster 41.

In step ST23, the lossless encoder 16 conducts lossless encoding. The lossless encoder 16 losslessly encodes quantized data output by the quantizer 15. In other words, data is compressed by applying lossless encoding such as variable-length coding or arithmetic coding to quantized data. At this point, the prediction mode information input into the lossless encoder 16 in step ST22 discussed above (which may include the macroblock type, prediction mode, motion vector information, and reference picture information, for example) is also losslessly encoded. Furthermore, the losslessly encoded prediction mode information data is added to the header information of the encoded stream generated by losslessly encoding the quantized data.

In step ST24, the accumulation buffer 17 conducts a buffering process to buffer an encoded stream. The encoded stream buffered in the accumulation buffer 17 is read out as appropriate and transmitted to the decoder via a transmission channel.

In step ST25, the rate controller 18 applies rate control. The rate controller 18 controls the rate of quantization operations by the quantizer 15 such that overflows or underflows do not occur in the accumulation buffer 17 when an encoded stream is being buffered in the accumulation buffer 17.

Figure 8:
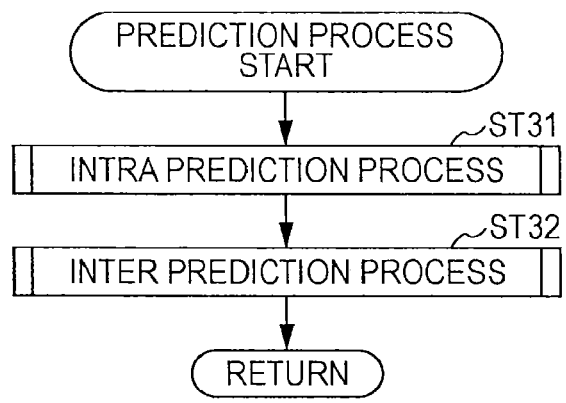
FIG. 8 is a flowchart illustrating a prediction process.

Next, the prediction process in step ST21 of FIG. 7 will be described with reference to the flowchart in FIG. 8.

In step ST31, the intra predictor 31 conducts intra prediction. The intra predictor 31 intra predicts processing target block images in all candidate intra prediction modes. Herein, decoded image data stored in the frame memory 25 that has not been filtered by the deblocking filter 24 is used as the image data of a decoded image referenced during intra prediction. Details of the intra prediction process will be discussed later, but as a result of this process, intra prediction is conducted in all candidate intra prediction modes, and cost function values are computed for all candidate intra prediction modes. Then, the one intra prediction mode with the best encoding efficiency is selected from among all intra prediction modes on the basis of the computed cost function values.

In step ST32, the motion prediction/compensation unit 32 conducts inter prediction. The motion prediction/compensation unit 32 uses filtered decoded image data stored in the frame memory 25 to inter predict in all candidate inter prediction modes (all prediction block sizes). Details of the inter prediction process will be discussed later, but as a result of this process, prediction processing is conducted in all candidate inter prediction modes, and cost function values are computed for all candidate inter prediction modes. Then, the one inter prediction mode with the best encoding efficiency is selected from among all inter prediction modes on the basis of the computed cost function values.

Figure 9:
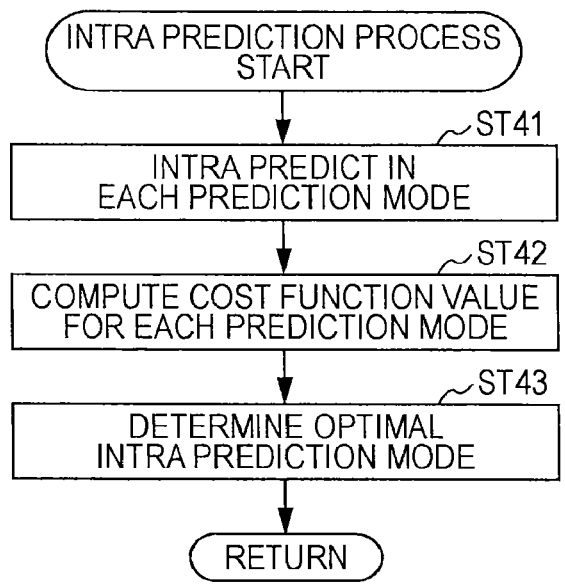
FIG. 9 is a flowchart illustrating an intra prediction process.

Next, the intra prediction process in step ST31 of FIG. 8 will be described with reference to the flowchart in FIG. 9.

In step ST41, the intra predictor 31 conducts intra prediction in respective prediction modes. The intra predictor 31 uses unfiltered decoded image data stored in the frame memory 25 to generate predictive image data for each intra prediction mode.

In step ST42, the intra predictor 31 computes a cost function value for each prediction mode. Computation of a cost function value is conducted on the basis of a technique in either a high-complexity mode or a low-complexity mode, as defined by the JM (Joint Model), the reference software for the H.264/AVC format.

In other words, in the high-complexity mode, the processing in step ST41 involves provisionally conducting lossless encoding in all candidate prediction modes, and computing a cost function value expressed by the following Eq. (30) for each prediction mode.

$$\text{Cost}(\text{Mode} \in \Omega) = D + \lambda \cdot R \quad (30)$$

Ω represents the set of all candidate prediction modes for encoding the blocks and macroblocks. D represents the differential energy (distortion) between a decoded image that has been encoded in a prediction mode, and an input image. R is the bit rate, including the orthogonal transform coefficients and prediction mode information, etc. λ is the Lagrange multiplier given as a function of the quantization parameter QP.

In other words, since encoding in the high-complexity mode involves computing the above parameters D and R, it is necessary to provisionally encode once in all candidate prediction modes, which is more computationally intensive.

Meanwhile, in the low-complexity mode, the processing in step ST41 involves generating a predictive image and computing header bits such as motion vector information and prediction mode information for all candidate prediction modes. Additionally, a cost function value expressed by the following Eq. (31) is computed for each prediction mode.

$$\text{Cost}(\text{Mode} \in \Omega) = D + Q P \text{toQuant}(QP) \cdot \text{Header\_Bit} \quad (31)$$

Ω represents the set of all candidate prediction modes for encoding the blocks and macroblocks. D represents the differential energy (distortion) between a decoded image that has been encoded in a prediction mode, and an input image. Header_Bit is the number of header bits for the prediction mode, and QPtoQuant is a function given as a function of the quantization parameter QP.

In other words, although in the low-complexity mode it is necessary to conduct a prediction process for each prediction mode, a decoded image is not necessary, and thus it is possible to realize the low-complexity mode with less computation than the high-complexity mode.

In step ST43, the intra predictor 31 determines the optimal intra prediction mode. The intra predictor 31 determines the optimal intra prediction mode by selecting the one intra prediction mode whose cost function value yields the minimum value from among the cost function values computed in step ST42.

Figure 10:
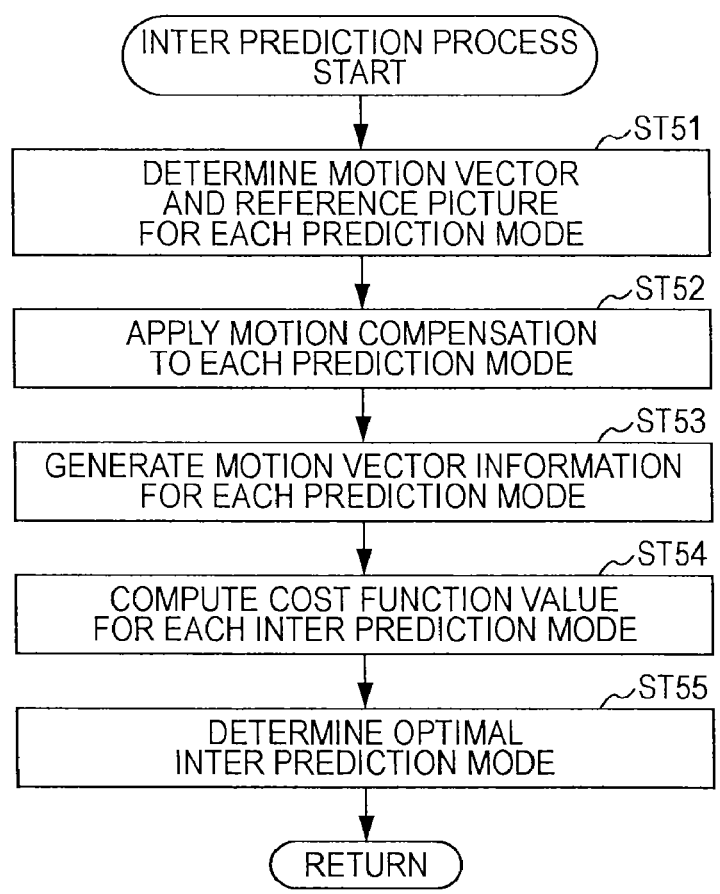
FIG. 10 is a flowchart illustrating an inter prediction process.

Next, the inter prediction process in step ST32 of FIG. 8 will be described with reference to the flowchart in FIG. 10.

In step ST51, the motion prediction/compensation unit 32 respectively determines a motion vector and a reference image for each prediction mode. In other words, the motion prediction/compensation unit 32 respectively determines a motion vector and a reference image for a target block in each prediction mode.

In step ST52, the motion prediction/compensation unit 32 applies motion compensation in each prediction mode. For each prediction mode (each prediction block size), the motion prediction/compensation unit 32 applies motion compensation to a reference image on the basis of a motion vector determined in step ST51, and generates predictive image data for each prediction mode.

In step ST53, the motion prediction/compensation unit 32 generates motion vector information in each prediction mode. The motion prediction/compensation unit 32 generates motion vector information to include in the encoded stream for a motion vector determined for each prediction mode. For example, a predictive motion vector may be determined using median prediction, etc., and motion vector information expressing the difference between a motion vector detected by motion prediction and the predictive motion vector may be generated. Motion vector information generated in this way is also used to compute a cost function value in the following step ST54, and in the case where its corresponding predictive image is ultimately selected by the predictive image/optimal mode selector 33, the motion vector information is included in the prediction mode information and output to the lossless encoder 16.

In step ST54, the motion prediction/compensation unit 32 computes a cost function value for each inter prediction mode. The motion prediction/compensation unit 32 computes a cost function value using Eq. (30) or (31) discussed earlier. Herein, the computation of a cost function value for an inter prediction mode also includes the cost function value scoring for skip mode and direct mode defined in the H.264/AVC format.

In step ST55, the motion prediction/compensation unit 32 determines the optimal inter prediction mode. The motion prediction/compensation unit 32 determines the optimal inter prediction mode by selecting the one prediction mode whose cost function value yields the minimum value from among the cost function values computed in step ST54.

Next, a deblocking filter adjustment process will be described. In the method of stipulating parameters regarding a deblocking filter in the H.264/AVC coding format, there exists a deblocking_filter_control_present_flag in the picture parameter set. It is configured such that slice_alpha_c0_offset_div2 and slice_beta_offset_div2 exist in the slice header in the case where this flag has a value of "1", whereas a default value of "0" is used in the case where they do not exist.

In contrast, in the present invention, the values of FilterOffsetA and FilterOffsetB are both defined according to the combination of two neighboring block sizes as in Table 4, in which offset values SZa and SZb are taken to be integers such that 0<SZa≤SZb≤6, for example.

TABLE 4

|  | 64 × 64 | 32 × 32 | 16 × 16 |
|---|---|---|---|
| 64 × 64 | SZb | SZb | SZb |
| 32 × 32 | SZb | SZa | SZa |
| 16 × 16 | SZb | SZa | 0 |

Table 4 illustrates offset values for individual combinations of the prediction block sizes for two neighboring blocks such that the filter strength is increased as the block size increases, in the case where a plurality of macroblocks with a larger block size than a given macroblock are used. Also, the offset values in Table 4 are set such that the filter strength is adjusted according to the larger prediction block size in the case where the two neighboring blocks have different prediction block sizes. In other words, the values of FilterOffsetA and FilterOffsetB are configured to match the block of larger size from between the two neighboring blocks. For example, the offset value SZb is used when the larger block is 64 pixels, the offset value SZa is used when the larger block is 32 pixels, and an offset value of "0" is used for 16×16 pixels.

Figure 11:
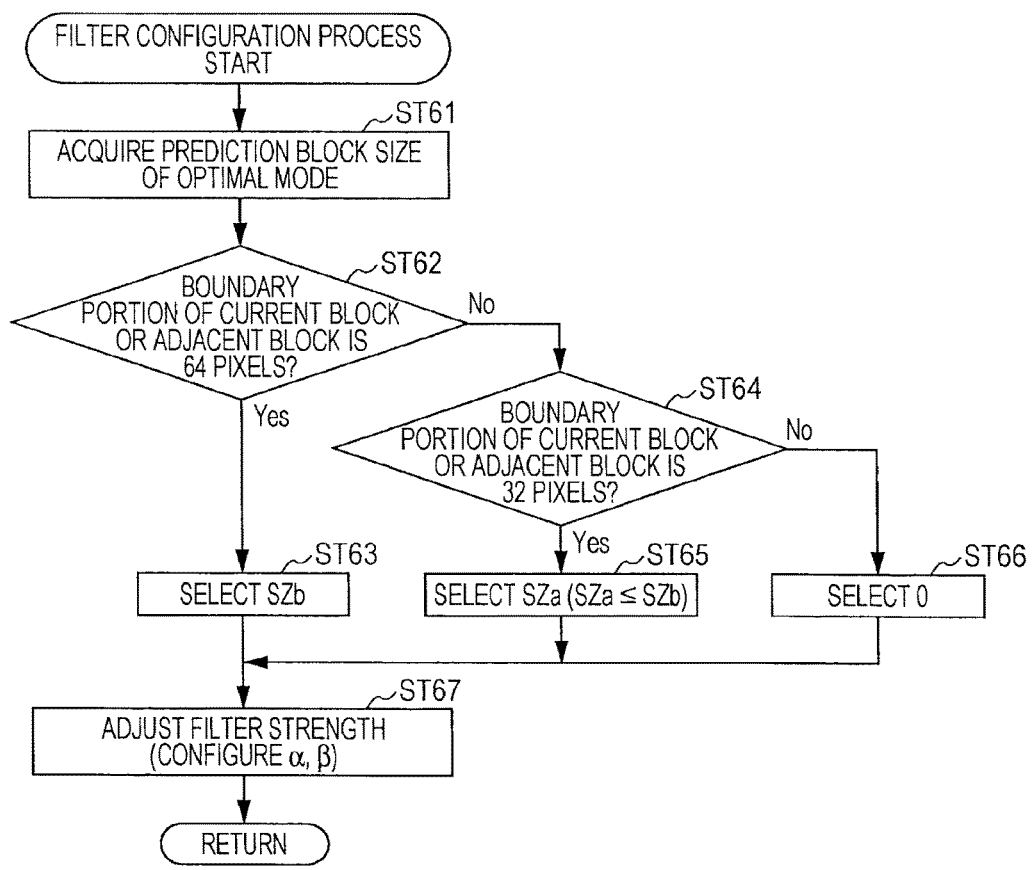
FIG. 11 is a flowchart illustrating a filter configuration process.

FIG. 11 is a flowchart illustrating a filter configuration process. In step ST61, the filter strength adjuster 41 acquires the prediction block size of the optimal mode. The filter strength adjuster 41 acquires the prediction block size corresponding to the predictive image selected in step ST22 of FIG. 7, or in other words, the prediction block size used when encoding in the optimal mode.

In step ST62, the filter strength adjuster 41 determines whether or not the boundary portion of the current block or neighboring block is 64 pixels. The filter strength adjuster 41 proceeds to step ST63 when the boundary portion of the current block of neighboring block is 64 pixels, and proceeds to step ST64 when the boundary portion of the current block and the neighboring block are both smaller than 64 pixels.

In step ST63, the filter strength adjuster 41 selects the offset value SZb, sets it as FilterOffsetA and FilterOffsetB, and proceeds to step ST67.

In step ST64, the filter strength adjuster 41 determines whether or not the boundary portion of the current block or neighboring block is 32 pixels. The filter strength adjuster 41 proceeds to step ST65 when the boundary portion of the current block of neighboring block is 32 pixels, and proceeds to step ST66 when the boundary portion of the current block and the neighboring block are both smaller than 32 pixels.

In step ST65, the filter strength adjuster 41 selects the offset value SZa (≤SZb), sets it as FilterOffsetA and FilterOffsetB, and proceeds to step ST67.

In step ST66, the filter strength adjuster 41 selects the offset value 0 (<SZa), sets it as FilterOffsetA and FilterOffsetB, and proceeds to step ST67.

In step ST67, the filter strength adjuster 41 adjusts the filter strength. The filter strength adjuster 41 uses FilterOffsetA and FilterOffsetB configured in step ST63, 65, or 66 to determine the threshold values $\alpha$ and $\beta$, i.e., the parameter values that set the filter strength, and outputs them to the deblocking filter 24.

In this way, as a result of the filter strength adjuster 41 configuring the threshold values $\alpha$ and $\beta$ with increased offset values when the block size at the boundary portion is large, filtering is more readily applied by the deblocking filter 24.

Note that although combinations of 64×64 pixels, 32×32 pixels, and 16×16 pixels are illustrated by example in Table 4 and FIG. 11, combinations are not limited to these sizes. Also, although the offset value SZb is used when the larger block is 64 pixels, the offset value SZa is used when the larger block is 32 pixels, and an offset value of "0" is used for 16×16 pixels, offset values are not limited to the above combinations, as long as favorable image quality is obtained by having the filter be more readily applied to larger blocks.

Furthermore, in the case where the user wants to configure his or her own value different from Table 4, it is possible for the user to configure the values of FilterOffsetA16, FilterOffsetA32, FilterOffsetA64, FilterOffsetB16, FilterOffsetB32, and FilterOffsetB64 in the slice header, with a given value of "1" set as the value of deblocking_filter_control_present_flag in the picture parameter set. These respective parameters correspond to the cases where the larger of the two neighboring blocks is 16×16, 32×32, and 64×64. Values for FilterOffsetA32, FilterOffsetA64, FilterOffsetB32, and FilterOffsetB64 need not exist in the slice header, even if the value of deblocking_filter_control_present_flag is 1. In this case, values such as $$FilterOffsetA32 = FilterOffsetA16 + SZa$$

$$FilterOffsetA64 = FilterOffsetA16 + SZb$$

$$FilterOffsetB32 = FilterOffsetB16 + SZa$$

$$FilterOffsetB64 = FilterOffsetB16 + SZb$$

may be used.

In this way, according to an image encoding apparatus and method to which the present invention has been applied, the block size yielding the best encoding efficiency is determined, and image data is encoded using the determined block size. At this point, information expressing the block size is buffered in the block size buffer 411 of the filter strength adjuster 41. Consequently, when image data that has been encoded using the block size yielding the best encoding efficiency is decoded and decoded image data is generated, the positions of prediction blocks in the decoded image are clear. For this reason, if the filter strength is adjusted on the basis of information buffered in the block size buffer 411 such that the filter is applied more readily to large block sizes, blocking artifacts can be reduced even if the block size is large. Also, since blocking artifacts can be reduced in a decoded image, the encoded data size can be further reduced, since it is possible to prevent increases in prediction error data due to the effects of blocking artifacts.

<5. Configuration of Image Decoding Apparatus>

An encoded stream that has been generated by encoding an input image is supplied to an image decoding apparatus via a given transmission channel or recording medium, etc. and decoded.

Figure 12:
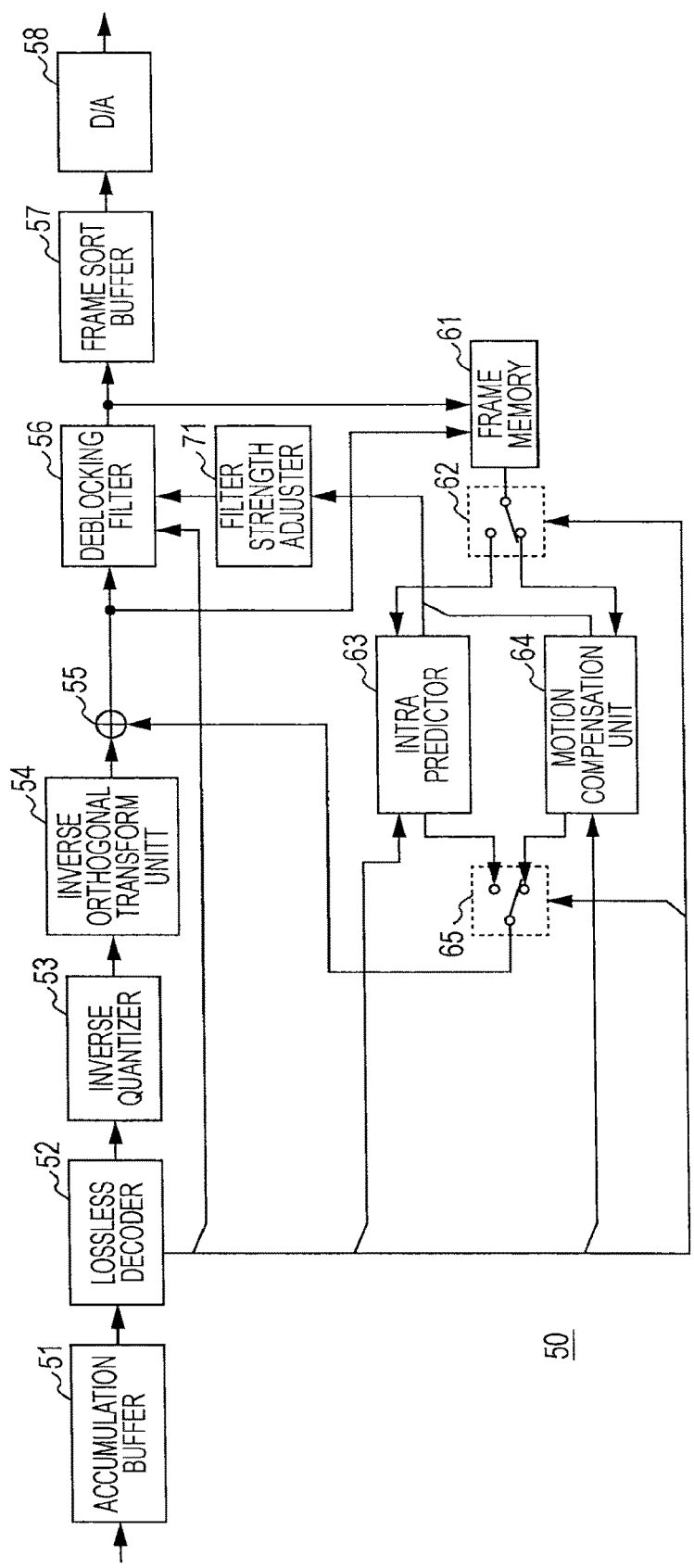
FIG. 12 illustrates a configuration of an image decoding apparatus.

FIG. 12 illustrates a configuration of an image decoding apparatus. The image decoding apparatus 50 is provided with an accumulation buffer 51, a lossless decoder 52, an inverse quantizer 53, an inverse orthogonal transform unit 54, an adder 55, a deblocking filter 56, a frame sort buffer 57, and a D/A converter 58. Additionally, the image decoding apparatus 50 is provided with frame memory 61, selectors 62 and 65, an intra predictor 63, a motion compensation unit 64, and a filter strength adjuster 71.

The accumulation buffer 51 buffers an encoded stream transmitted thereto. The lossless decoder 52 decodes an encoded stream supplied by the accumulation buffer 51 in a format corresponding to the encoding format of the lossless encoder 16 in FIG. 1. Also, the lossless decoder 52 decodes header information in the encoded stream to obtain prediction mode information, which is output to the intra predictor 63, the motion compensation unit 64, and the deblocking filter 56.

The inverse quantizer 53 takes quantized data that has been decoded by the lossless decoder 52 and inverse quantizes it in a format corresponding to the quantization format of the quantizer 15 in FIG. 1. The inverse orthogonal transform unit 54 takes the output from the inverse quantizer 53, applies an inverse orthogonal transform in a format corresponding to the orthogonal transform format of the orthogonal transform unit 14 in FIG. 1, and outputs the result to the adder 55.

The adder 55 adds together inverse orthogonally transformed data and predictive image data supplied from the selector 65 to generate decoded image data, which is output to the deblocking filter 56 and the frame memory 61.

The deblocking filter 56 filters decoded image data supplied from the adder 55 to remove blocking artifacts, and then supplies the result to the frame memory 61 for buffering, while also outputting the result to the frame sort buffer 57. The deblocking filter 56 also adjusts the filter strength on the basis of prediction mode information supplied from the lossless decoder 52 and threshold values α and β for filter strength adjustment supplied from the filter strength adjuster 71 discussed later.

The frame sort buffer 57 sorts images. In other words, the frame sequence that was resorted into an encoding order by the frame sort buffer 12 in FIG. 1 is resorted into the original display order and output to the D/A converter 58.

The D/A converter 58 D/A converts image data supplied from the frame sort buffer 57 and causes an image to be displayed by outputting the image data to a display not illustrated in the drawings.

The frame memory 61 stores the unfiltered decoded image data supplied from the adder 55 and the filtered and decoded image data supplied from the deblocking filter 24.

The selector 62, on the basis of prediction mode information supplied from the lossless decoder 52, supplies unfiltered decoded image data read out from the frame memory 61 to the intra predictor 63 when decoding a prediction block that has been intra predicted. Also, the selector 26, on the basis of prediction mode information supplied from the lossless decoder 52, supplies filtered and decoded image data read out from the frame memory 61 to the motion compensation unit 64 when decoding a prediction block that has been inter predicted.

The intra predictor 63 generates a predictive image on the basis of prediction mode information supplied from the lossless decoder 52, and outputs the generated predictive image data to the selector 65. The intra predictor 63 also outputs information indicating the block sizes of the generated predictive image to the filter strength adjuster 71.

The motion compensation unit 64 applies motion compensation and generates predictive image data on the basis of prediction mode information supplied from the lossless decoder 52, and outputs the result to the selector 65. In other words, on the basis of motion vector information and reference frame information contained in the prediction mode information, the motion compensation unit 64 generates predictive image data by applying motion compensation to the reference image indicated by the reference frame information using motion vectors based on the motion vector information. The motion compensation unit 64 also outputs information indicating the block sizes of the generated predictive image to the filter strength adjuster 71.

The selector 65 supplies predictive image data generated by the intra predictor 63 to the adder 55. The selector 65 also supplies predictive image data generated by the motion compensation unit 64 to the adder 55.

The filter strength adjuster 71 is configured similarly and operates similarly to the filter strength adjuster 41 illustrated in FIG. 4. The filter strength adjuster 71 adjusts the filter strength of the deblocking filter 56 by configuring parameter values that adjust the filter strength according to the prediction block size. Also, in the case where the prediction block size is an extended block size in the optimal mode for either the target block or a neighboring block, the filter strength adjuster 71 adjusts the filter strength according to the larger prediction block size. Additionally, in the case where a plurality of macroblocks with a larger block size than a given macroblock are used, the filter strength adjuster 71 adjusts the filter strength according to a combination of the prediction block sizes for two neighboring blocks, such that the filter strength is increased as the block size increases. In other words, the filter strength adjuster 71 configures the threshold values α and β, i.e., the parameter values for adjusting the filter strength, according to the block size supplied from the intra predictor 63 or the motion compensation unit 64, and outputs the configured parameter values to the deblocking filter 56.

<6. Operation of Image Decoding Apparatus>

Next, image decoding processing operations conducted by the image decoding apparatus 50 will be described with reference to the flowchart in FIG. 13.

In step ST71, the accumulation buffer 51 buffers an encoded stream transmitted thereto. In step ST72, the lossless decoder 52 conducts lossless decoding. The lossless decoder 52 decodes an encoded stream supplied from the accumulation buffer 51. In other words, quantized data for respective pictures that have been encoded by the lossless encoder 16 in FIG. 1 are obtained. Also, the lossless decoder 52 losslessly decodes prediction mode information contained in the header information of the encoded stream, and supplies the obtained prediction mode information to the deblocking filter 56 as well as the selectors 62 and 65. Furthermore, in the case where the prediction mode information is information regarding an intra prediction mode, the lossless decoder 52 outputs the prediction mode information to the intra predictor 63. Also, in the case where the prediction mode information is information regarding an inter prediction mode, the lossless decoder 52 outputs the prediction mode information to the motion compensation unit 64.

In step ST73, the inverse quantizer 53 conducts inverse quantization. The inverse quantizer 53 takes quantized data that has been decoded by the lossless decoder 52 and inverse quantizes it using characteristics that correspond to the characteristics of the quantizer 15 in FIG. 1.

In step ST74, the inverse orthogonal transform unit 54 applies an inverse orthogonal transform. The inverse orthogonal transform unit 54 applies an inverse orthogonal transform to transform coefficient data that has been inverse quantized by the inverse quantizer 53, using characteristics that correspond to the characteristics of the orthogonal transform unit 14 in FIG. 1.

In step ST75, the adder 55 generates decoded image data. The adder 55 generates decoded image data by adding together data obtained by applying the inverse orthogonal transform, and predictive image data selected in step ST79 to be discussed later. In so doing, an original image is decoded.

In step ST76, the deblocking filter 56 applies filtering. The deblocking filter 56 filters decoded image data output by the adder 55 to remove blocking artifacts contained in the decoded image.

In step ST77, the frame memory 61 conducts a decode image data storage process.

In step ST78, the intra predictor 63 and the motion compensation unit 64 conduct prediction processes. The intra predictor 63 and the motion compensation unit 64 conduct respective prediction processes corresponding to prediction mode information supplied from the lossless decoder 52.

In other words, in the case where prediction mode information for intra prediction is supplied from the lossless decoder 52, the intra predictor 63 conducts an intra prediction process on the basis of the prediction mode information, and generates predictive image data. Also, in the case where prediction mode information for inter prediction is supplied from the lossless decoder 52, the motion compensation unit 64 applies motion compensation on the basis of the prediction mode information, and generates predictive image data.

In step ST79, the selector 65 selects predictive image data. In other words, the selector 65 selects between a predictive image supplied from the intra predictor 63 and predictive image data generated by the motion compensation unit 64, and supplies the selection to the adder 55, which causes it to be added to the output from the inverse orthogonal transform unit 54 in step ST75, as discussed above.

In step ST80, the frame sort buffer 57 sorts images. In other words, the frame sort buffer 57 takes the frame sequence that was resorted into an encoding order by the frame sort buffer 12 of the image encoding apparatus 10 in FIG. 1, and resorts it into the original display order.

In step ST81, the D/A converter 58 D/A converts image data from the frame sort buffer 57. The image is output to a display not illustrated in the drawings, and the image is displayed.

Figure 13:
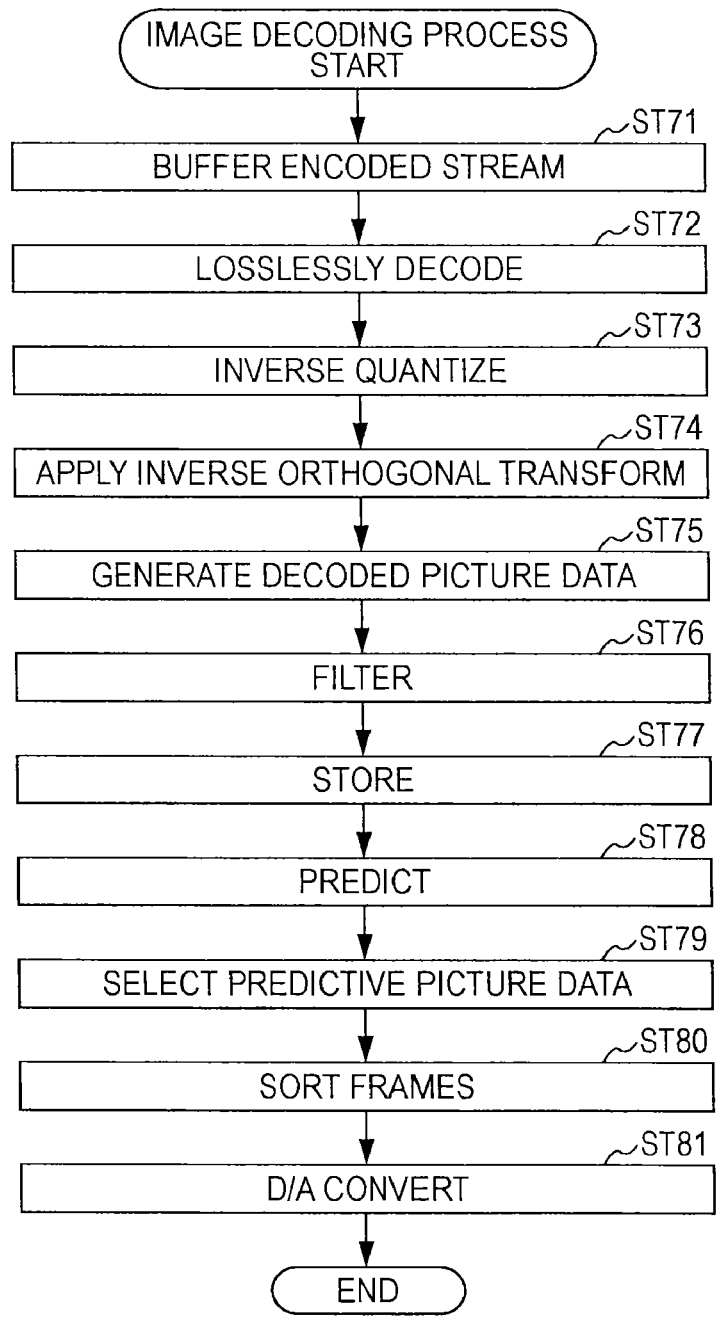
FIG. 13 is a flowchart illustrating image decoding processing operations.

Also, with the filter process in step ST76 of FIG. 13, the filter strength adjuster 71 conducts the filter strength adjustment process discussed earlier and illustrated in FIG. 11. The filter strength adjuster 71 configures the threshold values $\alpha$ and $\beta$, i.e., the parameter values that set the filter strength, such that the filter is more readily applied to larger prediction block sizes by adjusting the values of FilterOffsetA and FilterOffsetB, which are specified by the syntax elements slice_alpha_c0_offset_div2 and slice_beta_offset_div2 in the H.264/AVC standard, for example.

In this way, the filter strength adjuster 71 generates the threshold values $\alpha$ and $\beta$, i.e., the parameter values for adjusting the filter strength, according to the prediction block size from when encoding was conducted, and outputs them to the deblocking filter 56. The deblocking filter 56 determines block boundary strength data Bs on the basis of prediction mode information and uses the threshold values $\alpha$ and $\beta$ to filter decoded image data.

Also, when the value of the syntax element deblocking_filter_control_present_flag in the picture parameter set is set to a given value and values for FilterOffsetA and FilterOffsetB are stated in the slice header, the filter strength adjuster 71 uses the stated values to generate the threshold values $\alpha$ and $\beta$ and output them to the deblocking filter 56. If such filter strength adjustment is conducted, it becomes possible to apply filtering according to user settings even in the image decoding apparatus in the case where a user configured his or her own values different from those in Table 4 in the image encoding apparatus.

In this way, according to an image decoding apparatus and method to which the present invention has been applied, information indicating the block size used in the encoding process is buffered in a block size buffer of the filter strength adjuster 71. Consequently, when decoded image data is generated by decoded an encoded stream, the positions of prediction blocks in the decoded image are clear. For this reason, if the filter strength is adjusted on the basis of information buffered in the block size buffer such that the filter is applied more readily to large block sizes, blocking artifacts can be reduced even if the block size is large. Consequently, it becomes possible to obtain a decoded image with favorable image quality.

In addition, it is possible to execute the processes described in this specification in hardware, in software, or in a compound configuration of both. In the case of executing processes in software, a program stating a processing sequence may be installed onto memory in a computer built into special-purpose hardware and executed. Alternatively, it is also possible to install and execute the program on a general-purpose computer capable of executing various processes.

For example, the program may be recorded in advance onto a recording medium in the form of a hard disk or ROM (Read-Only Memory). Alternatively, the program may be temporarily or permanently stored (recorded) on a removable recording medium such as a flexible disk, CD-ROM (Compact Disc-Read-Only Memory), MO (Magneto-Optical) disc, DVD (Digital Versatile Disc), magnetic disk, or semiconductor memory. Such a removable recording medium may be provided in the form of what is called packaged media.

Meanwhile, besides being installed onto a computer from a removable recording medium as described above, the program may also be wirelessly transferred to a computer from a download site or transferred to a computer in a wired manner via a network such as a LAN (Local Area Network) or the Internet. On the computer, the program transferred in the above manner may be received and installed onto a recording medium such as an internal hard disk.

Furthermore, the present invention is not to be interpreted as being limited to the foregoing embodiments of the present invention. The embodiments of the invention disclose the present invention in an exemplary and illustrative form, and it should be obvious that modifications and substitutions may occur to persons skilled in the art without departing from the principal matter of the present invention. In other words, the principal matter of the present invention should be determined in consideration of the claims.

INDUSTRIAL APPLICABILITY

With an image processing apparatus and image processing method of the invention, the filter strength is adjusted according to the block sizes of neighboring blocks adjacent at a block boundary when applying filtering to remove blocking artifacts from decoded image data. For this reason, the filter strength is adjusted according to the block size even if macroblocks of extended size are used, and thus a decoded image with reduced blocking artifacts and favorable image quality is obtained. Consequently, the present invention is suitable for imaging encoding apparatus and image decoding apparatus used when image information (a bit stream) obtained by encoding in units of blocks as with MPEG and H.26x is transmitted and received via network media such as satellite broadcasting, cable TV, the Internet, and mobile phones, or processed on recording media such as optical or magnetic disks and flash memory.

REFERENCE SIGNS LIST 10 image encoding apparatus
11 A/D converter
12, 57 frame sort buffer
13 subtractor
14 orthogonal transform unit
15 quantizer
16 lossless encoder
17, 51 accumulation buffer
18 rate controller
21, 53 inverse quantizer
22, 54 inverse orthogonal transform unit
23, 55 adder
24 deblocking filter
25, 61 frame memory
26, 62, 65 selector
31, 63 intra predictor
32 motion prediction/compensation unit
33 predictive image/optimal mode selector
41 filter strength adjuster
50 image decoding apparatus
52 lossless decoder
58 D/A converter
64 motion compensation unit
71 filter strength adjuster
241 filter strength determining unit
242 filter processor
411 block size buffer
412 parameter selector

The invention claimed is:

1. An image processing apparatus comprising:
circuitry configured to:
adjust a strength of a filter for decoded image data using a first value in a case where at least one of neighboring blocks adjacent at a block boundary in the decoded image data has a first size;
adjust the strength of the filter for the decoded image data using a second value in a case where the at least one of neighboring blocks has a second size, the second size being smaller than the first size, the second value being different from the first value; and
apply filtering to the decoded image data according to the adjusted strength of the filter, wherein the first and second values are parameters to adjust the strength of the filter.

2. The image processing apparatus according to claim 1, wherein the values are configured to increase as the block sizes of the neighboring blocks increase.

3. The image processing apparatus according to claim 1, wherein the values are configured according to a combination of the block sizes of the neighboring blocks.

4. The image processing apparatus according to claim 3, wherein the values are configured according to a larger block size in a case that the block sizes differ between two neighboring blocks.

5. The image processing apparatus according to claim 1, wherein the circuitry is configured to:
configure the values for each block size of the neighboring blocks, and
select the values according to the block sizes of the neighboring blocks.

6. The image processing apparatus according to claim 1, wherein the circuitry is configured to adjust the strength of the filter based on a third value that is different from both the first value and the second value in a case where the at least one of neighboring blocks has a third size that is smaller than the second size.

7. The image processing apparatus according to claim 6, wherein the third value < the second value ≤ the first value.

8. An image processing method comprising:
adjusting, by circuitry of an information processing apparatus, a strength of a filter for decoded image data using a first value in a case where at least one of neighboring blocks adjacent at a block boundary in the decoded image data has a first size;
adjusting, by the circuitry, the strength of the filter for the decoded image data using a second value in a case where the at least one of neighboring blocks has a second size, the second size being smaller than the first size, the second value being different from the first value; and
applying, by the circuitry, filtering to the decoded image data according to the adjusted strength of the filter, wherein
the first and second values are parameters to adjust the strength of the filter.

9. The image processing method according the claim 8, wherein the values are configured to increase as the block sizes of the neighboring blocks increase.

10. The image processing method according to claim 8, wherein the values are configured according to a combination of the block sizes of the neighboring blocks.

11. The image processing method according to claim 10, wherein the values are configured according to a larger block size in a case that the block sizes differ between two neighboring blocks.

12. The image processing method according to claim 8, further comprising:
configuring the values for each block size of the neighboring blocks, and
selecting the values according to the block sizes of the neighboring blocks.

13. The image processing method according to claim 8, wherein the adjusting includes adjusting the strength of the filter based on a third value that is different from both the first value and the second value in a case where the at least one of neighboring blocks is a third size that is smaller than the second size.

14. The image processing method according to claim 13, wherein the third value< the second value≤ the first value.

* * * * *